(12) United States Patent
Gupta et al.

(10) Patent No.: US 10,382,594 B2
(45) Date of Patent: Aug. 13, 2019

(54) INTEGRATED HEAD-END UTILITY METERING SYSTEM

(71) Applicant: Landis+Gyr Innovations, Inc., Alpharetta, GA (US)

(72) Inventors: Arun Gupta, Panchkula Haryana (IN); Eric J. Kramer, Pillager, MN (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 304 days.

(21) Appl. No.: 15/094,074

(22) Filed: Apr. 8, 2016

(65) Prior Publication Data

US 2016/0301778 A1    Oct. 13, 2016

Related U.S. Application Data

(60) Provisional application No. 62/145,229, filed on Apr. 9, 2015, provisional application No. 62/157,146, filed on May 5, 2015.

(51) Int. Cl.
*G06F 15/16* (2006.01)
*H04L 29/06* (2006.01)
(Continued)

(52) U.S. Cl.
CPC ............ *H04L 69/18* (2013.01); *G01D 4/004* (2013.01); *H04L 67/10* (2013.01); *H04L 69/329* (2013.01);
(Continued)

(58) Field of Classification Search
CPC combination set(s) only.
See application file for complete search history.

(56) References Cited

U.S. PATENT DOCUMENTS

| 2008/0074285 A1* | 3/2008 | Guthrie | G01D 4/004 340/870.02 |
| 2012/0182157 A1 | 7/2012 | Carr et al. | |

(Continued)

FOREIGN PATENT DOCUMENTS

| EP | 2456084 | 5/2012 |
| WO | 2016164710 | 10/2016 |

OTHER PUBLICATIONS

International Application No. PCT/US2016/026622, "International Search Report and Written Opinion", dated Jun. 16, 2016, 12 pages.

*Primary Examiner* — Umar Cheema
*Assistant Examiner* — Anh Nguyen
(74) *Attorney, Agent, or Firm* — Kilpatrick Townsend & Stockton LLP

(57) ABSTRACT

Disclosed are various embodiments for transmitting data between an integrated head-end system and endpoint devices of a utility metering system. The utility metering system may include a single head-end system including an application layer, an end-device protocol layer, and a network protocol layer operable to generate messages for transmitting to the endpoint devices to obtain metering information. The layers may also be operable to interpret messages received from the endpoint devices including the metering information and convert the messages into a usable format. In some aspects, the end-device protocol layer and the network protocol layer may include adapters for converting information included in the messages based on a metering protocol or network protocol, respectively, used by the endpoint devices.

17 Claims, 8 Drawing Sheets

(51) Int. Cl.
*G01D 4/00* (2006.01)
*H04L 29/08* (2006.01)

(52) U.S. Cl.
CPC ........... *Y02B 90/242* (2013.01); *Y02B 90/246* (2013.01); *Y04S 20/322* (2013.01); *Y04S 20/42* (2013.01)

(56) References Cited

U.S. PATENT DOCUMENTS

| | | | | |
|---|---|---|---|---|
| 2013/0027219 A1* | 1/2013 | Myoung | ................ | H04Q 9/00 340/870.03 |
| 2013/0275736 A1* | 10/2013 | Kelley | ................ | G01D 4/004 713/1 |
| 2014/0167981 A1 | 6/2014 | Pontin et al. | | |
| 2016/0233682 A1* | 8/2016 | Do Rosario | ............ | H02J 3/387 |

* cited by examiner

INTEGRATED HEAD-END UTILITY METERING SYSTEM

CROSS-REFERENCE TO RELATED APPLICATIONS

This application claims priority to U.S. Provisional Application No. 62/145,229 entitled "System and Method for Communicating Using Different End Device Protocols and Different Network Protocols," filed Apr. 9, 2015 and U.S. Provisional Application No. 62/157,146 entitled "System and Method for Communicating Using Different End Device Protocols and Different Network Protocols," filed May 5, 2015, each of which is incorporated herein by reference for all purposes.

TECHNICAL FIELD

The present disclosure generally relates to a utility metering system, and, more particularly, although not necessarily exclusively, to an integrated head-end system for a utility metering system.

BACKGROUND

Networks may be used to interconnect endpoint devices located at premises where a resource, such as electricity, water, or gas is consumed. The metering devices may include a metrology unit to measure consumption of the resource and a wireless communication module to communicate with other nodes on a network. The devices may also communicate with a centralized data collection system, often called a "head-end system." One example of a head-end system is the COMMAND CENTER system provided by Landis+Gyr.

The head-end system may receive data from the endpoint devices and transmit instructions to the endpoint devices and other network devices to control their operation. To facilitate the different metering protocols and communication technologies to collect the data from the endpoint devices, multiple head-end systems are conventionally used. For example, different head-end systems may operate different metering protocols or communication technologies. As additional endpoint devices are incorporated into a metering environment, more head-end systems may be needed to accommodate new metering protocols and network protocols associated with the additional endpoint devices.

SUMMARY

In some aspects of the present disclosure, a head-end system may be communicatively couplable to at least a first network and a second network. The first network may include a first plurality of endpoint devices that use a first metering protocol and communicate within the first network using a first network protocol. The second network may include a second plurality of endpoint devices that use a second metering protocol and communicate within the second network using a second network protocol. The head-end system may include an application layer. The head-end system may also include an end-device protocol layer below the application layer. The end-device protocol layer may include a first metering protocol adapter that supports the first metering protocol and a second metering protocol adapter that supports the second metering protocol. The head-end system may also include a network protocol layer below the end-device protocol layer. The network protocol layer may include a first network protocol adapter that supports the first network protocol and a second network protocol adapter that support the second network protocol. The first metering protocol and the second metering protocol may be distinct. The first network protocol and the second network protocol may be distinct.

In additional aspects of the present disclosure, a method for transmitting a message to an endpoint device in a network, wherein the endpoint device including a meter and a communication module, may include generating, by an application layer of a head-end system, a request for metering information from the endpoint device. The request may include an identifier for the endpoint device. The method may also include transmitting, by the application layer, the request to an end-device protocol layer of the head-end system. The method may also include determining, by the end-device protocol layer, a metering protocol used by the endpoint device to obtain the metering information. The end-device protocol layer may use the identifier for the endpoint device received from the application layer to determine an identifier for the meter and may use the identifier for the meter to determine the metering protocol. The method may also include generating, by the end-device protocol layer, an instruction corresponding to the request and in a first format corresponding to the metering protocol. The method may also include transmitting, by the end-device protocol layer, the instruction to a network protocol layer of the head-end system. The instruction may include an identifier for the communication module. The method may also include determining, by the network protocol layer, a network protocol associated with the network that includes the endpoint device. The network protocol layer may use the identifier for the communication module to determine the network protocol. The method may also include packaging the instruction in the message having a second format corresponding to the network protocol. The method may also include transmitting the message to the endpoint device via the network.

In additional aspects of the present disclosure, a head-end system may be communicatively couplable to at least a first network and a second network. The first network may include a first plurality of endpoint devices that use a first metering protocol and communicate within the first network using a first network protocol. The second network may include a second plurality of endpoint devices that use the first metering protocol and communicate within the second network using a second network protocol. The head-end system may include an application layer. The head-end system may also include an end-device protocol layer below the application layer that includes a first metering protocol adapter that supports the first metering protocol. The head-end system may also include a network protocol layer below the end-device protocol layer that includes a first network protocol adapter that supports the first network protocol and a second network protocol adapter that support the second network protocol. The first network protocol and the second network protocol may be distinct.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
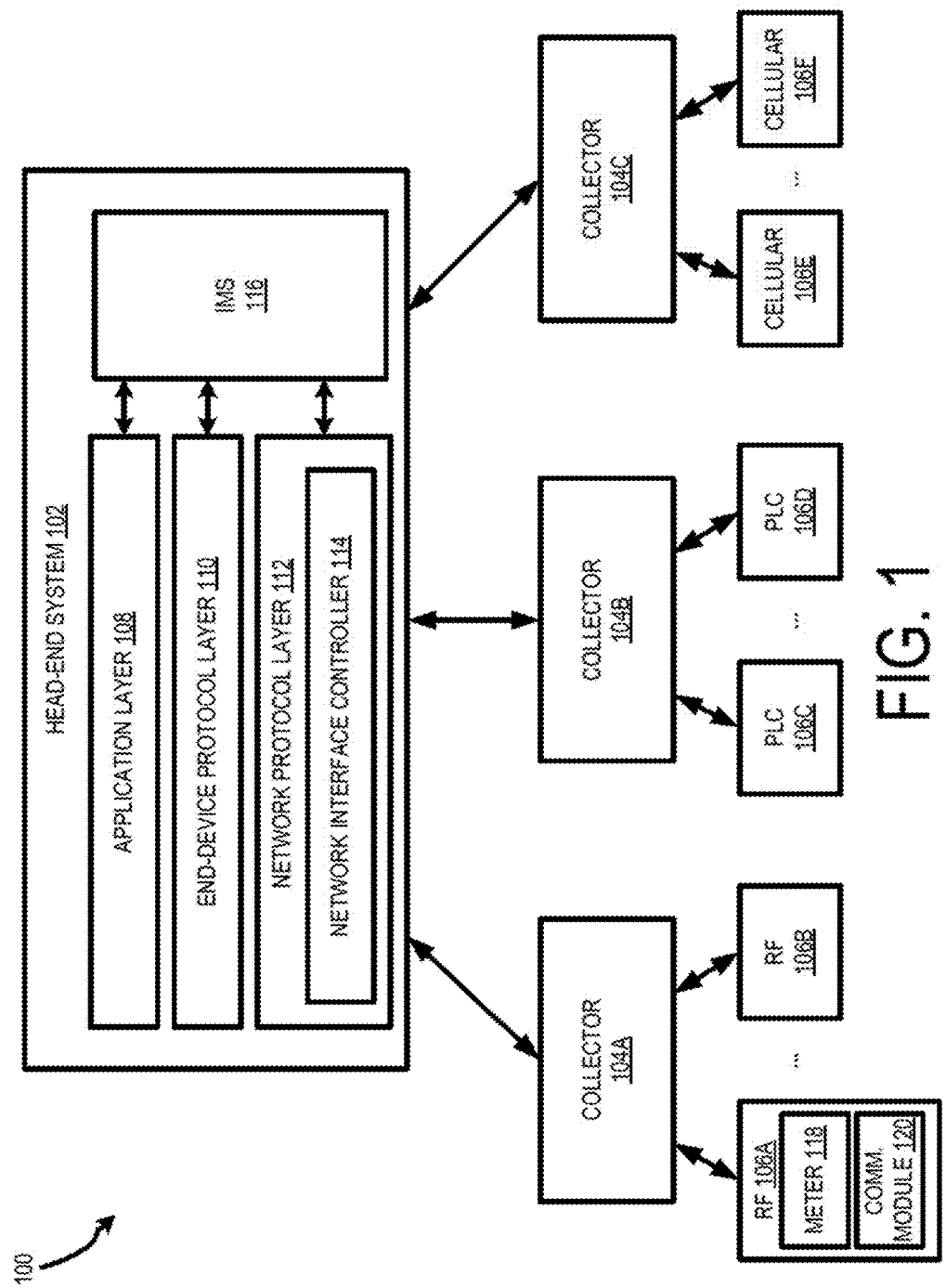
FIG. 1 is a block diagram of an exemplary metering environment according to some aspects of the present disclosure.

Certain aspects and features of the present disclosure relate to integrating complex and disparate metering protocols and communication technologies in a single head-end system. The head-end system may include multiple modular layers, including an application layer, an end-device protocol layer, and a network protocol layer, that collectively operate to transmit requests for information to endpoint devices communicatively coupled to the head-end system and to receive and process the information received from the endpoint devices in response to the requests. In some aspects, the endpoint devices may include metering devices configured to execute a metering protocol to measure consumption of a resource, such as electricity, gas, or water. The endpoint devices may be communicatively coupled to the endpoint devices through a network of collectors using different communication technologies.

The layers of the head-end system according to some aspects may execute different functions, or responsibilities, for generating outgoing messages to the endpoint devices and processing in-bound messages from the endpoint devices. For outgoing messages, the application layer may map a request to a system workflow, the end-device protocol layer may translate the request to a set of instructions based on the metering protocol of the endpoint device recipients, and the network protocol layer may package and transfer the instructions to the device. For incoming messages, the network protocol layer may extract bytes including the requested information, the end-device protocol layer may decode the bytes and tag the bytes with appropriate metering attributes, and the application layer may convert the information to a format to allow a user to read the requested information.

In some aspects, the end-device protocol layer and the network protocol layer may include one or more adapters for performing all or a portion of the dedicated functions of the respective layer of the head-end system. For example, the end-device protocol layer may include adapters for translating messages to or from a format compatible with the endpoint device to which the message is intended or from which the message is received, respectively The adapters in the end-device protocol layer may be configured to communicate with adapters in the network protocol layer. The adapters in the network protocol layer may be responsible for translating the messages to or from a format compatible with the communication technology associated with the network in which the endpoint device is located. In some aspects, adapters may be added or removed from a layer of the head-end system without requiring the head-end system to be redeployed.

A head-end system that is operable using a layered configuration may allow a single head-end system to function as a central system for communicating with endpoint devices using different metering protocols and different communication technologies. Using a single head-end system may more efficient and cost-effective over metering systems using different head-end systems for each metering protocol or communication technology. For example, cost-savings may be realized by the reduction in the number of components in the metering system and the associated labor costs in deploying and maintaining the components of the metering system. Also, using a single head-end system may allow for a centralized location for all of the information received from the endpoint devices without the inefficiencies of identifying an appropriate location for desired metering information. Further, the ability of a head-end system according to some aspects to seamlessly add additional adapters to communicate with endpoint devices using new and differing metering protocols and communication technologies may result in additional efficiencies in establishing and maintaining the communication between head-end system and the endpoint devices in the metering system.

These illustrative examples are provided to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

Referring now to the drawings, FIG. 1 depicts an exemplary operating environment 100 that includes a head-end system 102, collectors 104A, 104B, 104C and endpoints 106A, 106B, 106C, 106D, 106E, 106F. Each of the collectors 104A-C may represent one or a set of collectors coupled to the head-end system 102 and operating in different networks using different communication technologies. Each of the collectors 104A-C may be communicatively coupled to endpoint devices 106A-F within the respective network of the collector s 104A-C to transmit messages between the head-end system 102 and the endpoint devices 106A-F. For example, as indicated by the depiction of the endpoint devices 106A-F in FIG. 1, the endpoint devices 106A-F on the network may use different communication technologies, including radio frequency (RF), power line communication (PLC), and cellular. The collector 104A and endpoints 106A, 106B may communicate using RF, the collector 104B and endpoints 106C, 106D may communicate using PLC, and the collector 104C and the endpoints 106E, 106F may communicate using cellular. In some aspects, each communication technology may use a network protocol compatible with the technology. For example, the endpoint devices 106A, 106B operating in an RF technology may use a Radio Frequency Standard-Based Stack (RF-SBS) protocol, endpoints 106C, 106D may use a G3-PLC network protocol, and endpoint devices 106E, 106F may use a Machine-to-Machine (M2M) network protocol. Although RF, PLC, and cellular communication technologies and RF-SBS, G3-PLC, and M2M network protocols are described herein, other types of communication technologies and network protocols may be used by endpoints in the operating environment 100 without departing from the scope of the present disclosure.

In some aspects, the head-end system 102 may communicate with a collector 104A-C using a different communication technology than the communication technology used by the collector 104A-C and its respective endpoints 106A-F. Alternatively, the head-end system 102 may communicate with the collectors 104A-C using the same communication technology used by the collector and its respective endpoint devices 106-F. Although FIG. 1 depicts the head-end system 102 communicatively coupled to the collectors 104A-C that, in turn, are communicatively coupled to the endpoint devices 106A-F, the present disclosure is not limited to the illustrated topography and other configurations are possible. For example, in some aspects, the head-end system 102 may be directly coupled to the endpoint devices 106A-F or may be coupled to the endpoint devices 106A-F via intermediary devices other than collectors.

In some aspects, the endpoint devices 106A-F may include metering devices for measuring a consumption of a resource (e.g., electricity, water, gas, etc.). The metering devices may be associated with a physical location, such as a home, building, or unit within a building. The metering devices may store measurement data and communicate the data in a message to the head-end system 102 via the respective collector 104A-C in the network in which the endpoint devices 106A-F are located. Each of the endpoint devices 106A-F may operate using a metering protocol to collect, store, or transmit the data to the head-end system 102. Non-limiting examples of metering protocols that may be used by the endpoint devices 106A-F include Device Language Message Specification (DLMS) protocol/Companion Specification for Energy Metering (COSEM) protocol, American National Standard for Protocol Specification for Interfacing to Data Communication Networks (ANSI) protocol, and Brazilian National Standards Organization (ABNT) protocol. In some aspects, the metering protocol for each endpoint device 106A-F may be dictated based on the network in which the endpoint device 106A-F is located and the associated network protocol in which the endpoint device 106A-F is operating.

The head-end system 102 includes multiple layers that may be configured to generate and interpret messages associated with the endpoint devices 106A-F. For example, the head-end system 102 includes an application layer 108, an end-device protocol layer 110, and a network protocol layer 112. In some aspects, each of the layers 108, 110, 112 may be configured to perform distinct tasks for generating outgoing messages including instructions for one or more of the endpoint devices 106A-F and for processing data messages received from the endpoint devices 106A-F. Collectively, the layers 108, 110, 112 may operate to generate the outgoing messages in a format that is specific to the metering protocols and network protocol associated with endpoints devices 106A-F intended as recipients of the message. Also, the layers 108, 110, 112 may, collectively, operate to translate the messages received from the endpoint devices 106A-F in the formats associated with the protocols to a non-specific format readable for use by a business unit, the party requesting the information from the endpoint devices 106A-F, or other entities. For outgoing messages, the workflow of the head-end system 102 for generating the message may originate from the application layer 108 to the end-device protocol layer 110 to the network protocol layer 112 and to the endpoint devices 106A-F over an appropriate network. For incoming messages, the workflow of the head-end system 102 for receiving and processing the message may originate from the network protocol layer 112 to the end-device protocol layer 110 to the application layer 108. The network protocol layer may include a network interface controller 114 to transmit the outgoing messages and to receive the incoming messages. In some aspects, the network interface controller 114 may include a transmitter, receiver, transceiver, or other hardware components for physically interfacing with the networks coupled to the head-end system 102.

In some aspects, the layers 108, 110, 112 of the head-end system 102 may be positioned in one device (e.g., a server device). In other aspects, the layers 108, 110, 112 may be distributed between different interconnected devices. For example, each layer may be deployed on separate physical tiers, such as separate server devices, or separate sets of server devices. The distribution of the layers 108, 110, 112 may allow for horizontal scalability of the head-end system 102 to enhance availability of the functionality of the head-end system 102 by balancing the workload between the distributed devices. Further, due to the nature of the distinct functionalities of each of the layers 108, 110, 112 in some aspects of the head-end system 102, there may be differences with respect to the message-processing rate used in each layer. In some aspects, additional servers may be added to one or more of the layers 108, 110, 112 to harmonize the message processing rates across each layer 108, 110, 112 to achieve an optimal performance or throughput.

In some aspects, each server device included in the layers 108, 110, 112 may include a processing device that may enable the layers 108, 110, 112 to carry out computer and command functions. Non-limiting examples of the processing device may include a field-programmable gate array ("FPGA"), an application-specific integrated circuit ("ASIC"), a microprocessor, etc. In additional aspects, the layers 108, 110, 112 may also include a storage device. In some aspects, the storage device may include a database for storing information generated by the endpoint devices 106A-F and information associated with the respective networks and protocols of the endpoint devices 106A-F. In some aspects, the storage device may include any type of storage device that retains stored information when powered off. Non-limiting examples of the storage device may include electrically erasable and programmable read-only memory ("EEPROM"), a flash memory, or any other type of non-volatile memory or database.

In one example, due to the disparate nature of the metering protocols and communication technologies of the endpoint devices 106A-F, each layer 108, 110, 112 may include a different storage device to store information. In some aspects, the data may include transaction data, device configuration data, and networking data. For example, the transaction data may include data recorded by the endpoint devices 106A-F. This data may be stored in and distributed by the application layer 108. The device configuration data may include information related to the configuration of the endpoint device 106A-F for recording the transactional data. This data may be stored in and distributed by the end-device protocol layer 110. In some aspects, storing the device configuration data in the end-device protocol layer 110 may render the application layer 108 agnostic to the configuration changes of the endpoint devices 106A-F. The networking data may include addressing details and security levels associated with the operation of the networks including the endpoint devices 106A-F. This information may be stored in and distributed by the network protocol layer 112. In some aspects, storing the networking information in the network protocol layer 112 may render the application layer 108 and the end-device protocol layer 110 agnostic to the communication technology used for communicating with the endpoint devices 106A-F.

In some aspects, at least a portion of one or more of the storage devices of the layers 108, 110, 112 may include a computer-readable medium from which the processing device can read instructions. Non-limiting examples of a computer-readable medium include electronic, optical, magnetic, or other storage devices capable of providing the processing device with computer-readable instructions or other program code. Non-limiting examples of a computer-readable medium include, but are not limited to, magnetic disks, memory chips, ROM, random-access memory ("RAM"), an ASIC, a configured processor, optical storage, or any other medium from which a compute processor can read the instructions. The instructions may include processor-specific instructions generated by a compiler or an interpreter from code written in any suitable computer-programming language, including, for example, C, C+++, C#, etc.

The head-end system 102 also includes an identity management service (IMS) device 116. The IMS device 116 may be communicatively coupled to each of the layers 108, 110, 112 to provide identification information regarding the endpoint devices 106A-F associated with the messages generated or received by the head-end system 102. In some aspects, the IMS device 116 may include at least a storage device for storing identification information associated with each of the endpoint devices 106A-F. FIG. 1 shows an example of components of the endpoint device 106A that may be provide identification information for endpoint device 106A. The components include a meter unit 118 and a communication module 120. The meter unit 118 may include the meter including sensors or other recording devices for measuring the consumption of a resource. The communication module 120 may include a module, modem, or other communication device for communicating with the head-end system 102 and other devices in a network of the endpoint device 106A. Although FIG. 1 shows only the endpoint device 106A including the meter unit 118 and the communication module 120, each endpoint device 106A may include identical or similar components.

The meter unit 118 may include a serial number provided or assigned by the manufacturer of the meter unit 118. The communication module 120 may include an end-point serial number provided by or assigned by the manufacturer of the communication module 120. In some aspects, the IMS device 116 may store three unique identifiers for each of the endpoint devices 106A-F communicatively coupled to the head-end system 102 based on the serial numbers of the meter unit 118 and the communication module 120. The three unique identifiers may include (1) the serial number of the meter unit 118 ("a manufacturer serial number"), (2) the serial number of the communication module 120 ("an end-point serial number"), and (3) a combination of the serial numbers for the meter unit 118 and the communication module 120 ("a meter number") that may be assigned to the endpoint device 106A by the utility entity associated with the endpoint device 106. In some aspects, the application layer 108 may identify the endpoint device 106A by the meter number, the end-device protocol layer 110 may identify the endpoint device 106A by the manufacturer serial number, and the network protocol layer 112 may identify the endpoint device 106A by the endpoint serial number. In some aspects, the end-device protocol layer 110 may access each of the three identifiers to map the identity of the endpoint devices 106A-F to the application layer 108 and the network protocol layer 112 as messages are generated and processed by the head-end system 102 between the layers. For example, for outgoing messages, the application layer 108 may send a request to the end-device protocol layer using the meter number. The end-device protocol layer 110 may map the meter number to the manufacturer serial number before processing the request and mapping it to the endpoint serial number for transmission to the network protocol layer 112. For incoming messages, the network protocol layer 112 may transmit a message received via the network interface controller 114 to the end-device protocol layer 110 with the endpoint serial number. The end-device protocol layer 110 may map the endpoint serial number to the manufacturer serial number before processing the message and mapping it to the meter number for transmission to the application layer 108.

Figure 2:
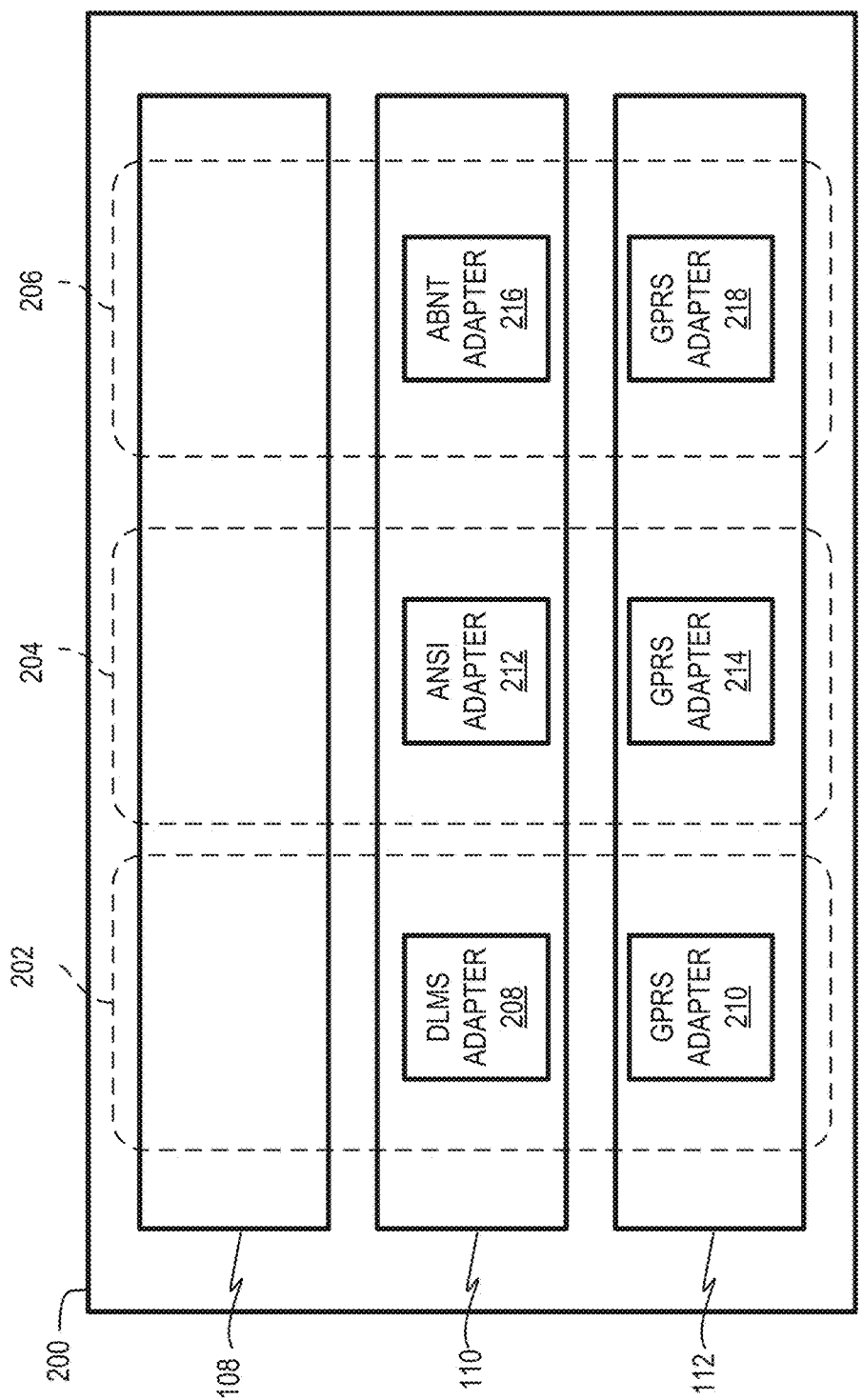
FIG. 2 is a block diagram of an exemplary head-end system for the metering environment of FIG. 1 according to some aspects of the present disclosure.
Figure 3:
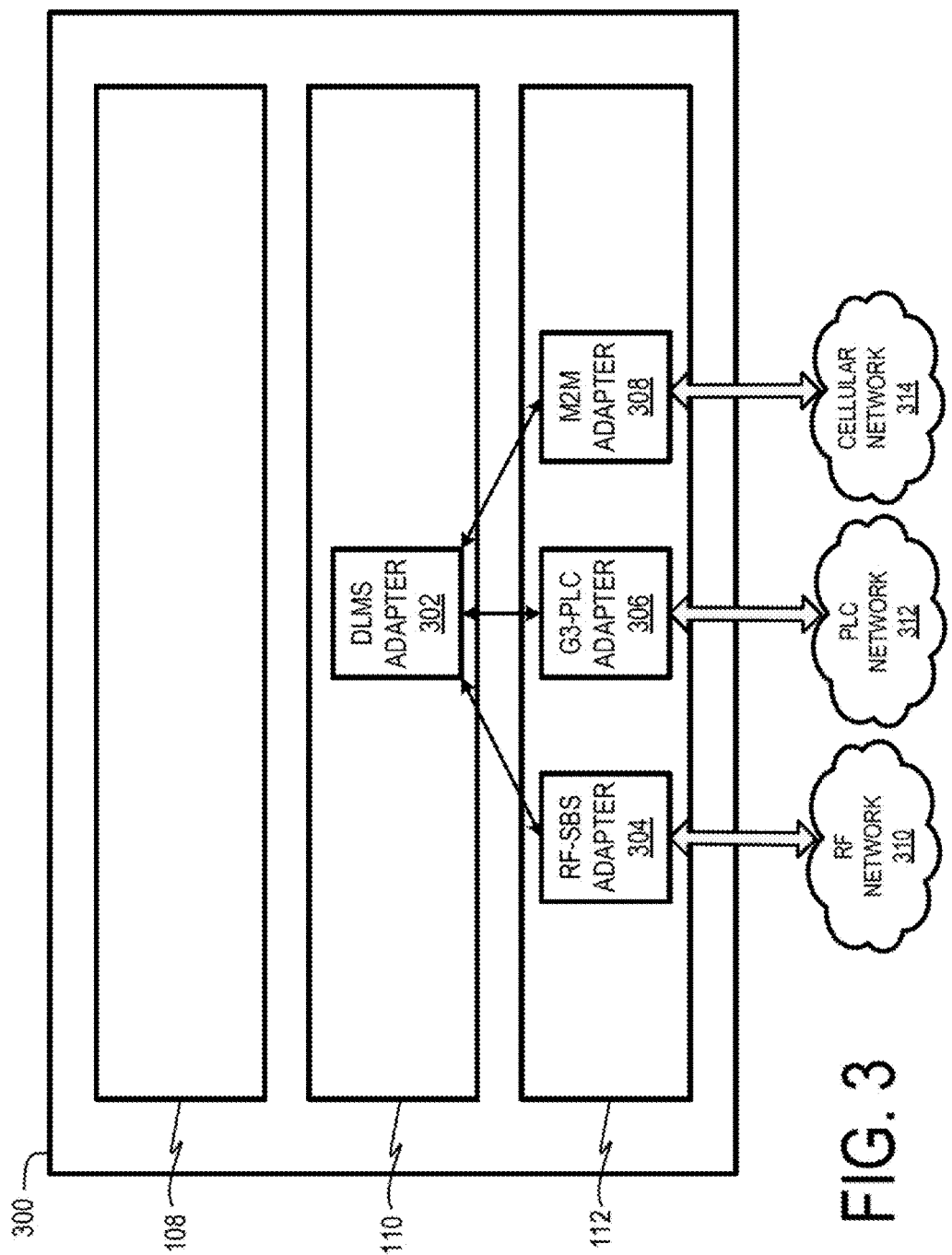
FIG. 3 is a block diagram of an exemplary head-end system including adapters according to some aspects of the present disclosure.
Figure 4:
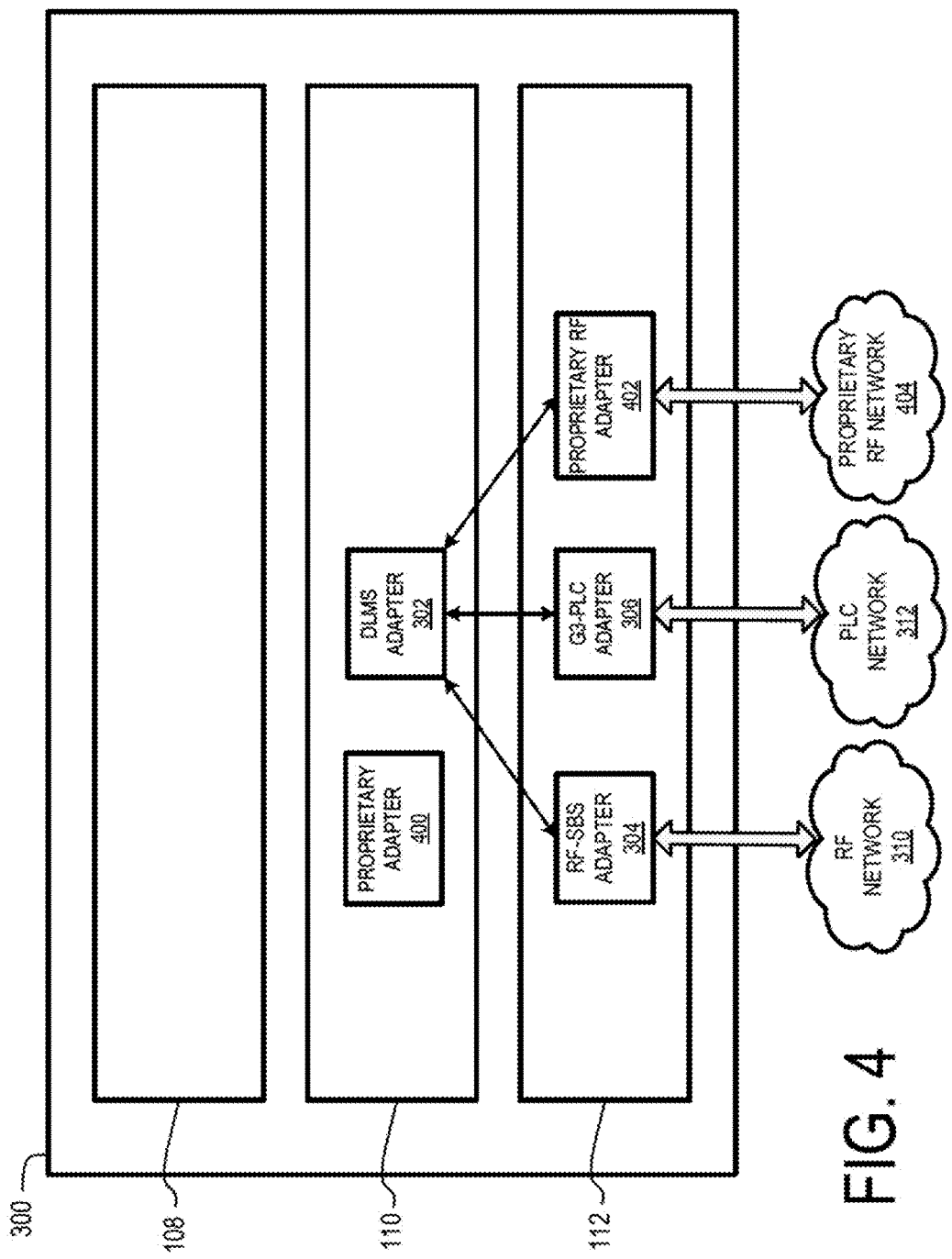
FIG. 4 is a block diagram of the head-end system of FIG. 3 including additional proprietary adapters according to some aspects of the present disclosure.

In some aspects, one or more of the layers 108, 110, 112 may include adapters for converting the information to a usable format by the respective layers 108, 110, 112 of the head-end system 102. Each of the adapters may include a hardware device or software component that is configured to convert data from one format to another format. FIGS. 2-4 represent exemplary head-end systems that may be included as the head-end system 102 of the environment 100 of FIG. 1. FIG. 2 depicts head-end system 200 that includes the application layer 108, the end-device protocol layer 110, and the network protocol layer 112. The end-device protocol layer 110 and the network protocol layer 112 include adapters positioned in the respective layers 110, 112. The head-end system 300 is configured such that different adapters are stacked together across the layers 110, 112 to serve the needs of different regions using a particular metering protocol or communication technology. For example, the head-end system 200 includes stacks 202, 204, 206 that may include adapters corresponding to metering protocols and communication technologies for endpoint devices located in Japan, North America, and Brazil respectively.

The stack 202 includes a DLMS adapter 208 positioned in the end-device protocol layer 110 and a general packet radio service (GPRS) adapter 210 positioned in the network protocol layer 112. The DLMS adapter 208 and the GPRS adapter 210 may be communicatively coupled between the layers 110, 112. The DLMS adapter 208 may include circuitry or software components to convert requests received from the application layer 108 into a format usable by an endpoint device using DLMS metering standards. The GPRS adapter 210 may receive outgoing messages transmitted to the network protocol layer 112 from the end-device protocol layer 110 and package the message into a format for transmission to the endpoint device using the DLMS metering standards in a GPRS-compatible network. The stack 204 includes an ANSI adapter 212 and a second GPRS adapter 214. The ANSI adapter 212 may include circuitry or software components to convert requests from the application layer 108 into a format usable by an endpoint device communicatively coupled to the head-end system 102 and using ANSI metering standards. Similar to the GPRS adapter 210, GPRS adapter 214 may receive outgoing messages transmitted to the network protocol layer 112 from the end-device protocol layer 110 and package the message into a format for transmission to the endpoint device using the ANSI metering standard in a GPRS-compatible network. The stack 206 includes an ABNT adapter 216 in the end-device protocol layer 110 that convert requests from the application layer 108 into instructions usable by an endpoint device using ABNT metering standards. Similar to the GPRS adapters 210, 214, GPRS adapter 218 may receive an outgoing message in the ABNT format and package the message for transmission in a GPRS-compatible network. Although the head-end system 102 shows a GPRS adapter in each of stacks 202, 204, 206, different stacks may use different adapters in the network protocol layer. Similarly, although the head-end system 102 uses a single stack for a single deployment in a network, multiple stacks may be included within a single deployment, for example, to support multiple network protocols in a single region.

FIG. 3 shows head-end system 300 that includes a single adapter positioned in the end-device protocol layer 110 to support multiple adapters in the network protocol layer 112. A DLMS adapter 302 is positioned in the end-device protocol layer 110 to convert requests received from the application layer 108 into a format usable by endpoint devices using the DLMS metering standards. The endpoint devices using the DLMS metering standards may be distributed across different networks. The adapters 304, 306, 308 are communicatively coupled to the DLMS adapter 302 and include circuitry or software components to package messages received from end-device protocol layer 110 using a format appropriate for transmission on one of multiple networks using different network protocols. For example, a RF-SBS adapter 304 may format messages received from the end-device protocol layer 110 for endpoint devices positioned in an RF network 310. A G3-PLC adapter 306 may format messages received from the end-device protocol layer 110 for endpoint devices positioned in a PLC network 312. An M2M adapter 308 may format messages received from the end-device protocol layer 110 for endpoint devices positioned in an M2M network, such as cellular network 314.

Although one adapter is shown in the end-device protocol layer 110 and three adapters are shown in the network protocol layer 112, the layers 110, 112 may include any number of adapters connectable in various combinations to format, package, and interpret messages according to endpoint devices positioned in different networks and using different metering protocols. In some aspects, the layers 110, 112 may include one or more adapters to support proprietary metering protocols or communication technologies used by the endpoint devices communicatively coupled to the head-end system 300.

FIG. 4 shows the head-end system 300 of FIG. 1 including additional adapters 400, 402 supporting proprietary metering protocols and communication technologies, respectively. The head-end system 300 may seamless integrate the additional adapters 402, 404 by plugging them into an appropriate layer 110, 112 without requiring the head-end system 102 to be redeployed in a particular network or region. For example, in some aspects, the additional adapters 402, 404 may be added to the head-end system 300 via a handshake process to establish a connection between the additional adapters 402, 404 and the head-end system 300. In some aspects, the handshake process may include an automated process to set parameters of communication channels between the additional adapters 400, 402 and the end-point protocol layer 110 and network protocol layer 112, respectively.

In FIG. 4, a proprietary adapter 400 may be included in the end-point protocol layer 110 to receive requests from the application layer 108 intended for endpoint devices using a proprietary metering protocol. The proprietary adapter 400 may format the request into a format usable by the appropriate endpoint devices. The formatted request may be transmitted to the network protocol layer and interpreted by an appropriate adapter corresponding to the network in which the endpoint devices using the proprietary metering protocol are positioned. For example, the proprietary adapter 400 may be communicatively coupled to an existing adapter in the head-end system (e.g., the RF-SBS adapter 304) that may receive an outgoing message formatted for the proprietary metering protocol and packaging the message for transmission to the appropriate endpoint devices in the RF network 310.

A proprietary RF adapter 402 may also be included in the network protocol layer 112 for packaging messages received from the end-point device protocol layer 110. The proprietary RF adapter may be positioned in the network protocol layer 112 to package messages for transmission to endpoint devices positioned in a proprietary RF network 404. As indicated by the arrows in FIG. 4, the endpoint devices positioned in the proprietary RF network 404 may use a DLMS metering protocol. The proprietary RF adapter may 402 may receive one or more messages formatted using the DLMS adapter and package them for transmission to the appropriate endpoint devices in the proprietary RF network.

Figure 5:
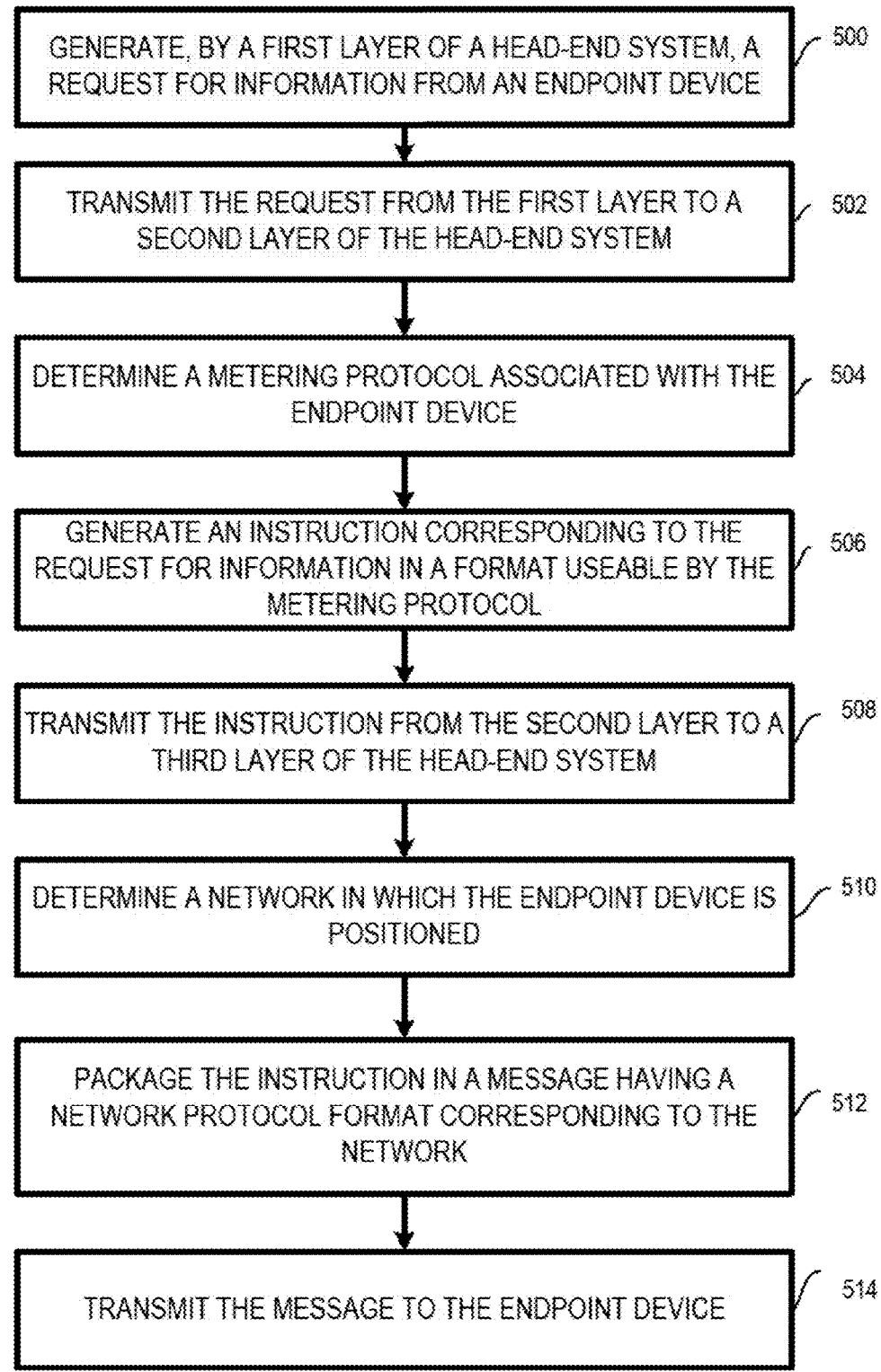
FIG. 5 is a flowchart depicting an exemplary process for transmitting messages from a head-end system to endpoint devices according to some aspects of the present disclosure.
Figure 6:
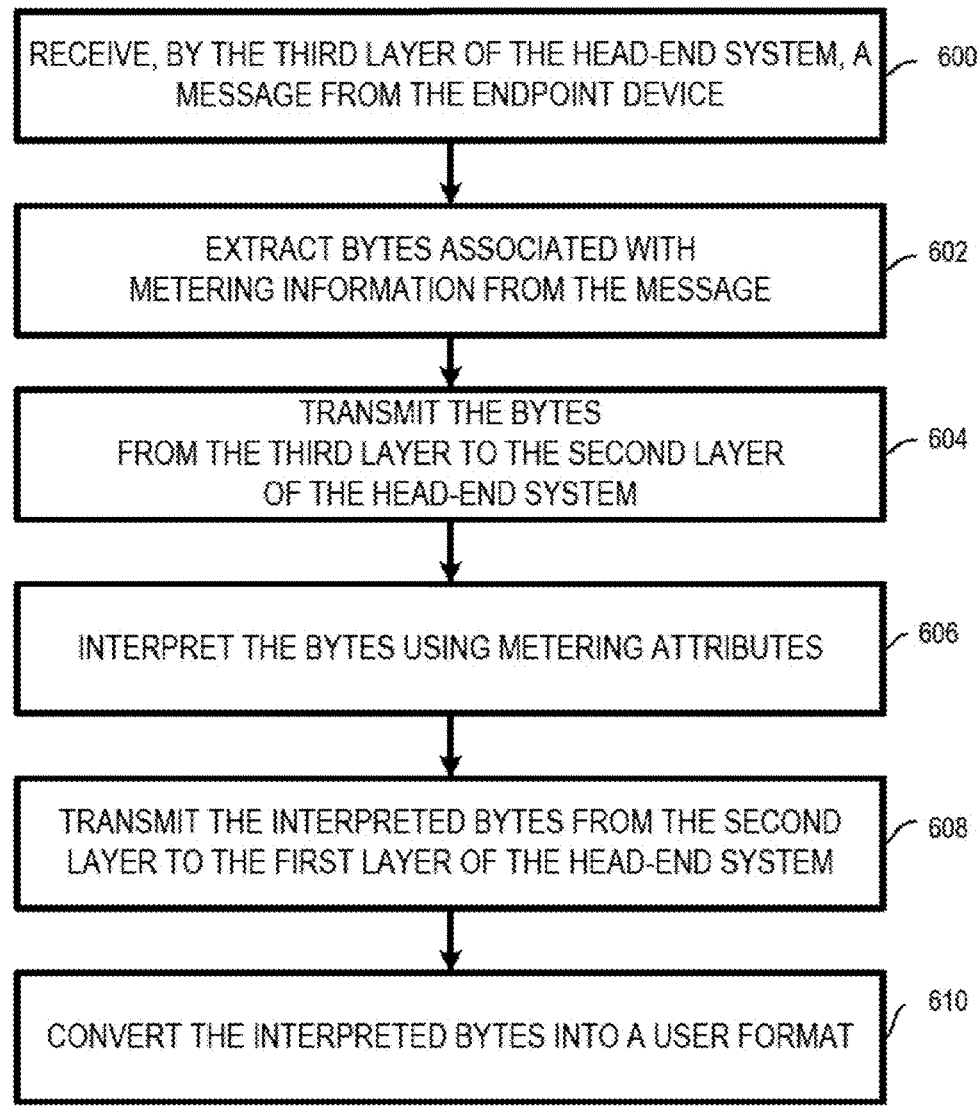
FIG. 6 is a flowchart depicting an exemplary process for processing messages received from an endpoint device by a head-end system according to some aspects of the present disclosure.

FIGS. 5 and 6 describe processes for transmitting messages between a head-end system and endpoint devices communicatively coupled to the head-end system. The processes are described with respect to the components of FIGS. 1-4, unless otherwise indicated, although other implementations are possible without departing from the scope of the present disclosure. It is understood that the flowcharts of FIGS. 5 and 6 provide merely examples of many different types of functional arrangements that may be employed to implement the data transmission operations of the methods described therein.

FIG. 5 describes a process for generating outgoing messages from a head-end system 102, to endpoint devices 106A-F positioned in various networks and using various metering protocols.

In block 500, the application layer 108 may generate a request for information from an endpoint device, e.g., endpoint device 106A. In some aspects, the application layer 108 may include one or more servers including one or more processing devices for executing instructions to translate information input by a user related to a request for metering information from the metering unit 118 of the endpoint device 106A. In some aspects, the application layer 108 may include a user interface or other interface including input means for allowing a user to request information of a particular type or from a particular endpoint device or set of endpoint devices 106A-F. The application layer 108 may generate the request based on the input. For example, the application layer 108 may receive a request for a meter reading from the metering unit 118 in kilowatt-hours. The application layer 108 may invoke a workflow to read the metering unit 118 and generate a request (e.g., "Get +kWh") that may be transmitted to the end-device protocol layer 110. The request may include a primitive component (e.g., "Get") as well as a parameter component (e.g., "+kwh") to request that the metering unit 118 obtain a reading in kilowatt-hours.

In some aspects, the request may be transmitted with identification information corresponding to the endpoint device 106A from which the request is intended. The application layer 108 may retrieve identification information from the IMS device 116. For example, the application layer 108 may retrieve a meter number including a combination of the serial numbers corresponding to the metering unit 118 and the communication module 120 of the endpoint device 106A. The application layer 108 may transmit the identification information to the end-device protocol layer 110 with the request to identify the appropriate endpoint device for receiving the instruction to obtain the requested information.

In block 502, the request is transmitted from the application layer 108 to the end-device protocol layer 110. In some aspects, the application layer 108 may include a transmitter, transceiver, or other transmission device for transmitting the request to the end-device protocol layer 110. In additional aspects, the end-device protocol layer 110 may include a receiver, transceiver, or other receiving device for receiving the request from the end-device protocol layer 110. In some aspects, the layers 108, 110, 112 may be integral in a single server device and the request may be transmitted from the application layer 108 to the end-device protocol layer 110 via a bus or other communication link between the layers 108, 110. In other aspects, the layers 108, 112 may be included in separate servers of the head-end system 102 and the request may be transmitted from the application layer 108 to the end-device protocol layer 110 via a wired or wireless communication link or other suitable means.

In block 504, the end-device protocol layer 110 may determine a metering protocol associated with the endpoint device 106A. In some aspects, the end-device protocol layer 110 may determine the metering protocol using the identification information transmitted with the request identifying the endpoint device 106A. The end-device protocol layer 110 may include or access a database including specification details regarding the endpoint device 106A and other endpoint devices 106A and may use the identification information, or a portion of the identification information (e.g., the manufacturer serial number of the metering unit 118) to retrieve the specification details including the metering protocol used by the endpoint device 106A.

In block 506, the end-device protocol layer 110 may generate an instruction corresponding to the request for information. The request may be generated in a format corresponding to the determined metering protocol for the endpoint device 106A. For example, where the endpoint device 106A uses a DLMS metering protocol, the end-device protocol layer 110 may generate an instruction set as "Get Request Normal" corresponding to the DLMS protocol. The instruction may include a set of bytes including a Companion Specification for Energy Metering (COSEM) attribute descriptor associated with the parameter of the request received from the application layer 108 (e.g., "+kWh"). In some aspects, the end-device protocol layer 110 may include a DLMS adapter for converting the request to the instruction in the "Get Request Normal" format associated with the DLMS protocol. In another example, where the endpoint device 106A uses an ANSI metering protocol, the end-device protocol layer 110 may generate instruction set as a "PartialTableReadRequest" corresponding to the ANSI protocol. The instruction may be a set of bytes including a table number associated with the parameter of the request. In some aspects, the end-device protocol layer 110 may include an ANSI adapter for converting the request to the instruction in the "PartialTableReadRequest" format associated with the ANSI protocol. The end-device protocol layer 110 may similar generate an instruction in an appropriate format corresponding to a metering protocol associated with the endpoint device 106A, including formats defined by a proprietary protocol.

In block 508, the end-device protocol layer 110 may transmit the instruction to the network protocol layer 112. In some aspects, the end-device protocol layer 110 may include hardware components and a similar configuration as the application layer 108 described in block 502 to transmit the instruction to the network protocol layer 112 in a similar manner that the request was transmitted from the application layer 108 to the end-device protocol layer 110. In some aspects, the information may include a primitive component (e.g., "Send") and a parameter (e.g., Bytes") to transmit the instruction from the end-device protocol layer 110 to the network protocol layer 112.

In some aspects, the instruction may be transmitted with identification information corresponding to the endpoint device 106A. In some aspects, the end-device protocol layer 110 may retrieve the identification information from the IMS device 116. In other aspects, the end-device protocol layer 110 may retrieve the identification information from the request transmitted from the application layer 108. The end-device protocol layer 110 may map the manufacturer serial number retrieved from the IMS device 116 or received from the application layer 108 to an endpoint serial number for transmission to the network protocol layer 112.

In block 510, the network protocol layer 112 may determine a network in which the endpoint device 106A is positioned, or a network protocol associated with the network in which the endpoint device 106A is positioned. In some aspects, the network protocol layer 112 may determine the network or network protocol using the identification information transmitted with the instruction. The network protocol layer 112 may include or access a database having details regarding the endpoint device 106A. The details may include the network in which the endpoint device 106A is positioned, the communication technology used by the network and the endpoint device 106A, or both. The network protocol layer 112 may retrieve the details and identify the network or network protocol associated with the endpoint device 106A.

In block 512, the network protocol layer 112 packages the instruction in a message having a network protocol format corresponding to the network or the network protocol of the endpoint device 106A. For example, where the network of the endpoint device 106A uses a GPRS network protocol, the network protocol layer 112 may package the instruction in a message formatted as an IPv4 packet. In some aspects, the packaged message may include the bytes of the instruction, headers, a network address, or and other information that may be transmitted to the endpoint device 106A on the network. Once the instruction is packaged as a message, in block 514, the network protocol layer 112 transmits the message to the endpoint device 106A. In some aspects, the network protocol layer 112 may use the network interface controller 114 or other transmitting device to transmit the message to the endpoint device 106A via the network.

FIG. 6 describes a process for processing a message received from the endpoint device 106A communicatively coupled to the head-end system 102. In block 600, a message is received from the endpoint device 106A by the network protocol layer 112. In some aspects, the network interface protocol may include a receiver or other receiving device to receive the message via the network including the endpoint device 106A In block 602, bytes corresponding to metering information from the endpoint device 106A are extracted from the message by the network protocol layer 112. In some aspects, the bytes may be extracted by removing the headers, addressing information, and other attributes for the bytes from the message, leaving only the raw bytes corresponding to the metering information from the endpoint device 106A. In some aspects, the network protocol layer 112 may include one or more adapters for extracting the bytes from the message. The adapter may correspond to the network protocol associated with the network in which the endpoint device 106A is positioned. The adapters may identify the attributes of the message and determine the bytes to extract.

In block 604, the network protocol layer 112 transmits bytes associated with the message to the end-device protocol layer 110. In some aspects, the network protocol layer 112 may transmit the bytes using a transmitter, transceiver, or other suitable transmitting device communicatively coupled to a receiving device in the end-device protocol layer 110 for receiving the bytes. In some aspects, the bytes of the message may be transmitted with identification information (e.g., the endpoint serial number) associated with the endpoint device 106A to allow the end-device protocol layer 110 to associate the bytes with the endpoint device 106A.

In block 606, the end-device protocol layer 110 interprets the bytes using metering attributes corresponding to the metering information associated with the bytes. In some aspects, the end-device protocol layer 110 may interpret the bytes using metering attributes by transforming them into primitive data types to obtain the appropriate representation, and applying any scalars, or factors, required to obtain the true metering information. The primitive data types may include, but are not limited to, a date, a date and time, an integer, a decimal, and character strings. In some aspects, the end-device protocol layer 110 may determine the appropriate representation by identifying the metering protocol used by the endpoint device 106A to obtain the metering information. In some aspects, the end-device protocol layer 110 may use identification information associated with the endpoint device 106A to determine the metering protocol. For example, the end-device protocol layer 110 may map an endpoint serial number received from the network protocol layer 112 to a manufacturing serial number and use the IMS device 116 or a database including details corresponding to the endpoint devices 106A-F communicatively coupled to the head-end system 102 to determine the metering protocol used by the endpoint device 106A. The end-device protocol layer 110 may decorate or tag the appropriate representation of the bytes with metering attributes corresponding to the metering information. Non-limiting examples of metering attributes include physical quantity (e.g., kWh, voltage, current, etc.), methods of computation (e.g., average, minimum, maximum, summation, etc.), energy type, name, time of use, current or historic information, and rates. In some aspects, the end-device protocol layer 110 may use an adapter corresponding to the identified metering protocol to interpret the bytes into primitive types and tag or decorate them with the metering attributes.

In block 608, the end-device protocol layer 110 transmits the interpreted bytes to the application layer 108. The end-device protocol layer 110 may include a transmitter, transceiver, or other transmitting device communicatively coupled to a receiving device of the application layer 108 to transmit the interpreted bytes in a metering protocol-independent format to the application layer 108.

In block 610, the application layer 108 may convert the interpreted bytes into a format requested or usable by the user (e.g., reports or other user-friendly formats). In some aspects, the user may determine the format in which the application layer 108 should convert the interpreted bytes based on a request input by the user in a user interface of the application layer 108. In other aspects, where the metering information is transmitted to the head-end system 102 in response to a request for the information by the user, the application layer 108 may automatically determine the appropriate format based on the original request. The format may provide business meaning to the metering information retrieved from endpoint device 106A. For example, the application layer 108 may allow a user to generate a report or analysis of the metering information, including, but not limited to load profiling reports, billing reports, and event reports.

Figure 7:
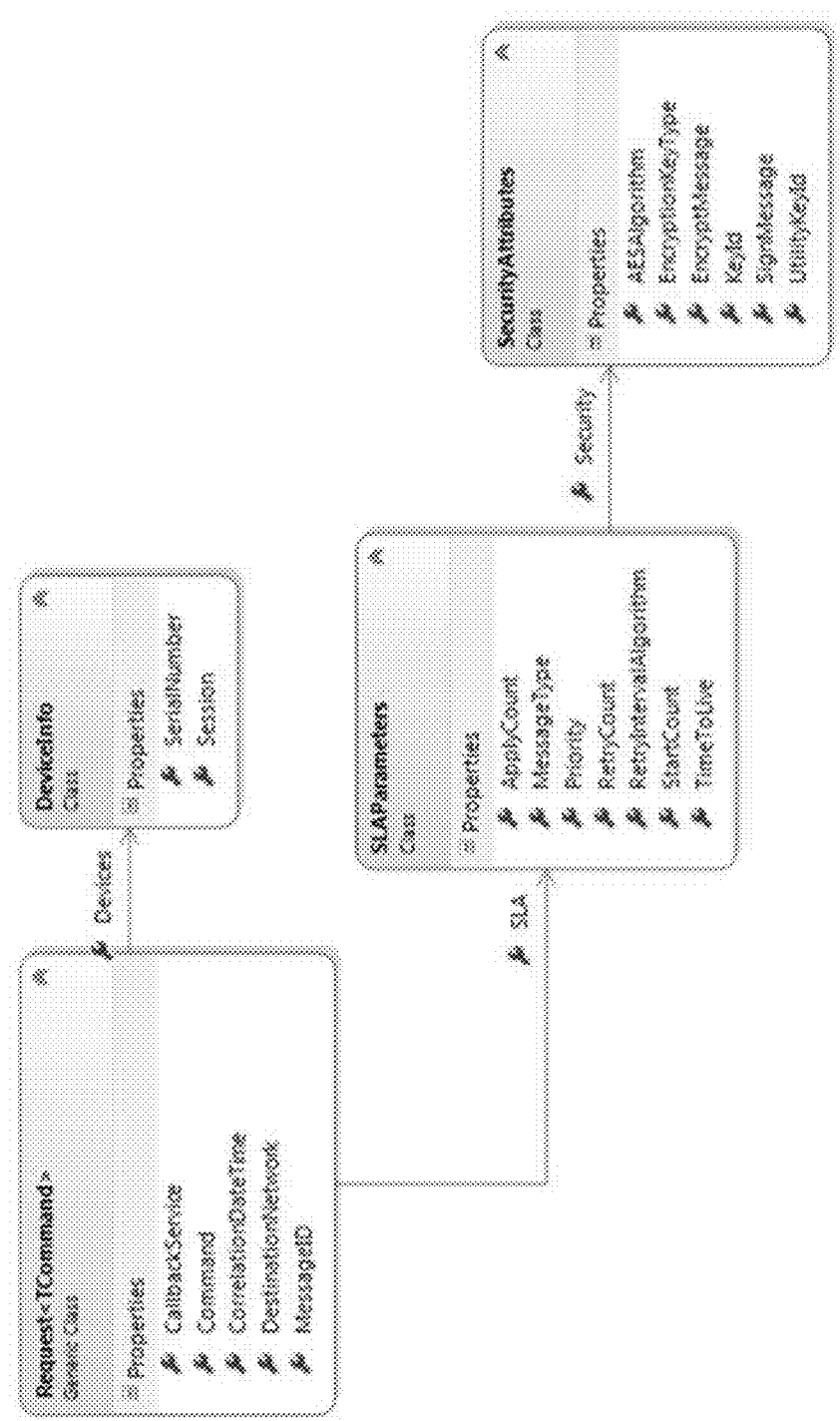
FIG. 7 is an example of classes of request structures for transmitting information between the layers of a head-end system according to some aspects of the present disclosure.
Figure 8:
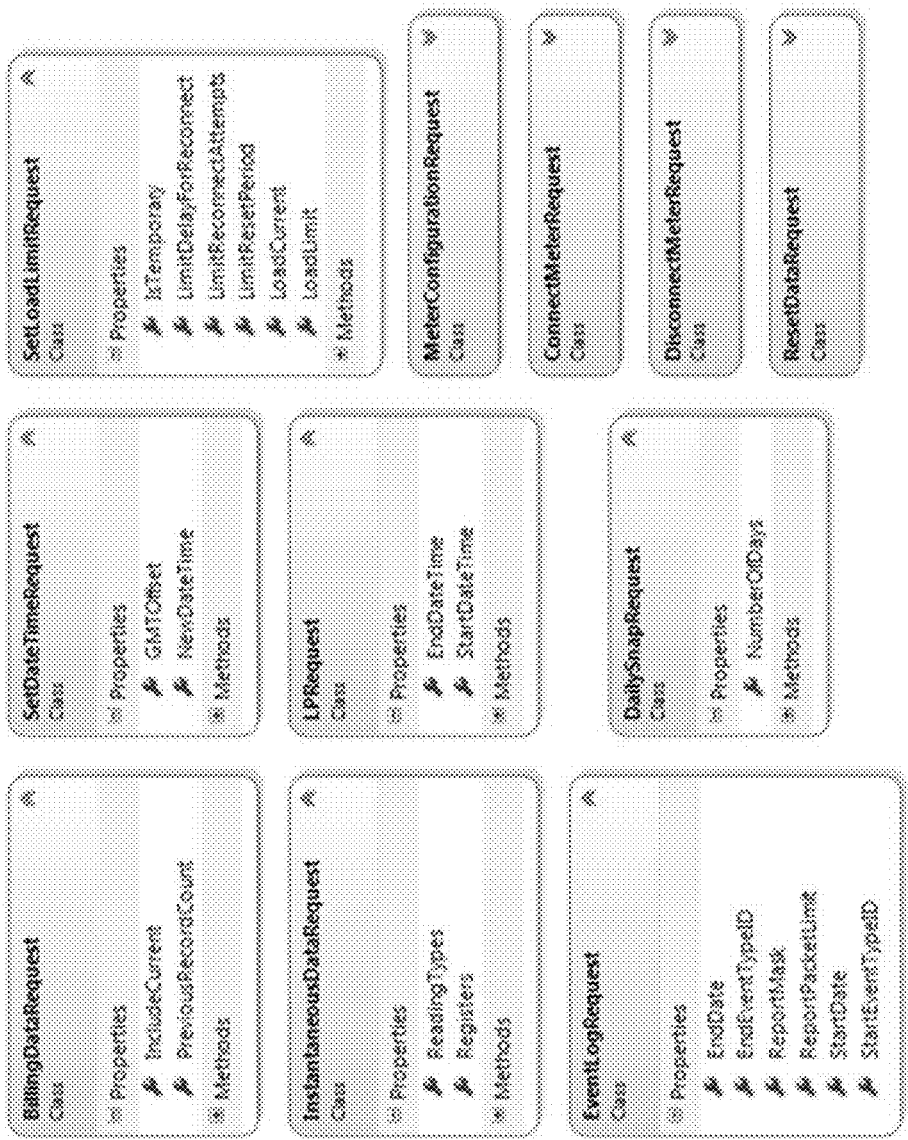
FIG. 8 is an example of commands corresponding to the request structures of FIG. 7 for transmitting information between the layers of a head-end system according to some aspects of the present disclosure.

FIG. 7 is an example of various classes of request structures that may be used by the head-end system 102 to transmit information between the layers 108, 110, 112. In some aspects, the head-end system 102 may include an advanced metering infrastructure (AMI) including various requirements for transmitting the information between the layers 108, 110, 112. In some aspects, the structures listed in FIG. 7 correspond to attributes to specify target networks, response callback addresses, whether the messages should be encrypted and signed (and the algorithm to be used for the encryption and executed signature), and a number of retries that each layer 108, 110, 112 must make to communicate with an adjacent layer in the case of an error or processing failure. FIG. 8 includes a list of commands that may be used within the request structures of FIG. 7 per the requirements of the AMI. In some aspects, the request structures of FIG. 7 and the commands of FIG. 8 are non-exhaustive lists and additional structures and commands may be included in the head-end system 102 as necessary.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following is claimed:

1. A head-end system comprising a processing device and a storage device, communicatively couplable to at least a first network and a second network, comprising:
    an application layer;
    an end-device protocol layer below the application layer that includes a first metering protocol adapter that supports a first metering protocol and a second metering protocol adapter that supports a second metering protocol; and
    a network protocol layer below the end-device protocol layer that includes a first network protocol adapter that supports a first network protocol and a second network protocol adapter that supports a second network protocol,
    wherein the first network includes a first plurality of endpoint devices that use the first metering protocol and communicate within the first network using the first network protocol and the second network includes a second plurality of endpoint devices that use the second metering protocol and communicate within the second network using the second network protocol, wherein the first metering protocol and the second metering protocol are distinct and the first network protocol and the second network protocol are distinct, wherein the application layer generates a first request for metering information from a first endpoint device and a second request for metering information from a second endpoint device, wherein the end-device protocol layer receives the first request for metering information and the second request for metering information from the application layer, determines that the first endpoint device in the first plurality of endpoint devices is associated with the first metering protocol, determines that the second endpoint device in the second plurality of endpoint devices is associated with the second metering protocol, routes the first request to the first metering protocol adapter to convert the first request into a first end-device request having a first format corresponding to the first metering protocol, routes the second request to the second metering protocol adapter to convert the second request into a second end-device request having a second format corresponding to the second metering protocol, and wherein the network protocol layer receives the first end-device request for metering information and the second end-device request for metering information from the end-device protocol layer, routes the first end-device request to the first network protocol adapter to package the first end-device request into a first network message for transmission to the first endpoint device using the first network protocol, routes the second end-device request to the second network protocol adapter to package the second end-device request into a second network message for transmission to the second endpoint device using the second network protocol, transmits the first network message including the first end-device request for metering information over the first network using the first network protocol to the first endpoint device and transmits the second network message including the second end-device request for metering information over the second network using the second network protocol to the second endpoint device.

2. The head-end system of claim 1, further comprising, an identity management service device accessible by the application layer, the end-device protocol layer, and the network protocol layer, wherein the identity management service device includes device information associated with each of the endpoint devices in the first plurality of endpoint devices and the second plurality of endpoint devices, the device information including a plurality of identifiers corresponding to each of the endpoint devices.

3. The head-end system of claim 2, wherein the first endpoint device includes a meter and a communication module, and wherein the plurality of identifiers includes a first identifier associated with the first endpoint device and corresponding to the meter, a second identifier associated with the first endpoint device and corresponding to the communication module, and a third identifier associated with the first endpoint device and corresponding to the first endpoint device.

4. The head-end system of claim 3, wherein the application layer is operable to reference the first endpoint device using the third identifier, wherein the end-device protocol layer is operable to reference the first endpoint device using the first identifier, and wherein the network protocol layer is operable to reference the first endpoint device using the second identifier.

5. The head-end system of claim 3, wherein the first identifier corresponds to a serial number for the meter, wherein the second identifier corresponds to a serial number for the communication module, and wherein the third identifier corresponds to a combination of the serial number for the meter and the serial number for the communication module.

6. The head-end system of claim 3, wherein the end-device protocol layer is operable to determine, using the first identifier, whether the first endpoint device uses the first metering protocol or the second metering protocol and to route a request generated by the application layer to the first metering protocol adapter or the second metering protocol adapter based on the first identifier.

7. The head-end system of claim 1, wherein the end-device protocol layer further includes an additional metering protocol adapter that supports an additional metering protocol used by a third plurality of endpoint devices communicatively couplable to the head-end system and included within the first network, and wherein the first network protocol adapter is operable in the network protocol layer to receive messages from the first metering protocol adapter and the additional metering protocol adapter.

8. The head-end system of claim 1, wherein the network protocol layer further includes an additional network protocol adapter that supports an additional network protocol used by a third plurality of endpoint devices to communicate within an additional network communicatively couplable to the head-end system, wherein the third plurality of endpoint devices uses the first metering protocol, and wherein the additional network protocol adapter is operable in the network protocol layer to receive messages from the first metering protocol adapter and the second metering protocol adapter.

9. A method for transmitting a message to an endpoint device in a network, wherein the endpoint device includes a meter and a communication module, the method comprising:

generating, by an application layer of a head-end system, a request for metering information from the endpoint device, wherein the request includes an identifier for the endpoint device;

transmitting, by the application layer, the request to an end-device protocol layer of the head-end system;

receiving the request for metering information by the end-device protocol layer;

determining, by the end-device protocol layer, a metering protocol used by the meter of the endpoint device to obtain the metering information, wherein the end-device protocol layer uses the identifier for the endpoint device received from the application layer to determine an identifier for the meter and uses the identifier for the meter to determine the metering protocol;

based on the metering protocol used by the endpoint device, routing, by the end-device layer, the request for metering information to a first metering protocol adapter in the end-device layer, wherein the first metering protocol adapter is one of a plurality of metering protocol adapters included in the end-device layer and the plurality of metering protocol adapters support a plurality of distinct metering protocols;

generating, by the first metering protocol adapter, an instruction corresponding to the request, wherein the instruction is in a first format corresponding to the metering protocol;

transmitting, by the end-device protocol layer, the instruction to a network protocol layer of the head-end system, wherein the instruction includes an identifier for the communication module;

receiving the instruction from the end-device protocol layer by the network protocol layer;

determining, by the network protocol layer, a network protocol associated with the network that includes the endpoint device, wherein the network protocol layer uses the identifier for the communication module to determine the network protocol;

based on the network protocol used by the communication module of the endpoint device, routing, by the network protocol layer, the instruction to a first network protocol adapter in network protocol layer, wherein the first network protocol adapter is one of a plurality of network protocol adapters included in the network protocol layer and the plurality of network protocol adapters support a plurality of distinct network protocols;

packaging the instruction into a network message for transmission to the endpoint device using the network protocol by the first network protocol adapter; and transmitting the network message to the endpoint device via the network.

10. The method of claim 9, further comprising,
using, by the end-device protocol layer, the identifier for the endpoint device to identify the identifier for the communication module.

11. The method of claim 9, wherein determining, by the end-device protocol layer, the metering protocol used by the endpoint device to obtain the metering information comprises the end-device protocol layer accessing an identification management device, the identification management device including a plurality of identifiers for a plurality of endpoint devices in the network, the plurality of identifiers including the identifier for the endpoint device, the identifier for the meter, and the identifier for the communication module.

12. The method of claim 9, further comprising:
receiving, by the network protocol layer, a response from the endpoint device including the metering information;
extracting, by the network protocol layer, bytes associated with the metering information from the response;
transmitting, by the network protocol layer, the bytes to the end-device protocol layer;
interpreting, by the end-device protocol layer, the bytes using primitive types and metering attributes corresponding to the metering information;
transmitting the bytes interpreted to the application layer; and
generating, by the application layer, a report including the metering information in a requested format.

13. The method of claim 9, wherein generating, by the first metering protocol adapter, the instruction includes applying, by the first metering protocol adapter, the first format to the instruction, and
wherein packaging the instruction into a network message includes applying, by the first network protocol adapter, a second format to the network message.

14. A head-end system comprising a processing device and a storage device, communicatively couplable to at least a first network and a second network, comprising:
an application layer;
an end-device protocol layer below the application layer that includes a first metering protocol adapter that supports a first metering protocol, wherein the first metering protocol adapter is one of a plurality of metering protocol adapters included in the end-device protocol layer and the plurality of metering protocol adapters support a plurality of distinct metering protocols; and
a network protocol layer below the end-device protocol layer that includes a first network protocol adapter that supports a first network protocol and a second network protocol adapter that support a second network protocol,
wherein the first network includes a first plurality of endpoint devices that use the first metering protocol and communicate within the first network using the first network protocol and the second network includes a second plurality of endpoint devices that use the first metering protocol and communicate within the second network using the second network protocol,
wherein the first network protocol and the second network protocol are distinct,
wherein the application layer generates a first request for metering information from a first endpoint device and a second request for metering information from a second endpoint device,
wherein the end-device protocol layer receives the first request for metering information and the second request for metering information from the application layer, determines that the first endpoint device in the first plurality of endpoint devices is associated with the first metering protocol, determines that the second endpoint device in the second plurality of endpoint devices is associated with the first metering protocol, routes the first request to the first metering protocol adapter to convert the first request into a first end-device request having a format corresponding to the first metering protocol and routes the second request to the first metering protocol adapter to convert the second request into a second end-device request having the first metering protocol, and
wherein the network protocol layer receives the first end-device request and the second end-device request from the end-device protocol layer, routes the first end-device request to the first network protocol adapter to package the first end-device request into a first network message for transmission to the first endpoint device using the first network protocol, routes the second end-device request to the second network protocol adapter to package the second end-device request in a second network message for transmission to the second endpoint device using the second network protocol and transmits the first network message including the first end-device request over the first network using the first network protocol to the first endpoint device in the first network and transmits the second network message including the second end-device request over the second network using the second network protocol to the second endpoint device in the second network.

15. The head-end system of claim 14, further comprising:
an identity management service device accessible by the application layer, the end-device protocol layer, and the network protocol layer,
wherein the identity management service device includes device information associated with each of the endpoint devices in the first plurality of endpoint devices and the second plurality of endpoint devices, the device information including a plurality of identifiers corresponding to each of the endpoint devices.

16. The head-end system of claim 15, wherein the first endpoint device of the first plurality of endpoint devices includes a first meter and a first communication module, wherein the second endpoint device of the second plurality of endpoint devices includes a second meter and a second communication module,
wherein the plurality of identifiers includes a first identifier associated with the first endpoint device and corresponding to a serial number for the first meter, a second identifier associated with the first endpoint device and corresponding to a serial number for the first communication module, a third identifier associated with the first endpoint device and corresponding to a combination of the serial number for the first meter and the serial number for the first communication module, a fourth identifier associated with the second endpoint device and corresponding to a serial number for the second meter, a fifth identifier associated with the second endpoint device and corresponding to a serial number for the second communication module, and a sixth identifier associated with the second endpoint device and corresponding to a combination of the serial number for the second meter and the serial number for the second communication module the second endpoint device,
wherein the application layer is operable to reference the first endpoint device using the third identifier and to reference the second endpoint device using the sixth identifier,
wherein the end-device protocol layer is operable to reference the first endpoint device using the first identifier and to reference the second endpoint device using the fourth identifier,
wherein the network protocol layer is operable to reference the first endpoint device using the second identifier and to reference the second endpoint device using the fifth identifier.

17. The head-end system of claim 14, wherein the end-device protocol layer further includes an additional metering protocol adapter that supports an additional metering protocol used by a third plurality of endpoint devices communicatively couplable to the head-end system and included within the first network, and
wherein the first network protocol adapter and the second network protocol adapter are operable in the network protocol layer to receive messages from the first metering protocol adapter and the additional metering protocol adapter.

* * * * *